United States Patent
Kaseyama et al.

(10) Patent No.: US 12,148,915 B2
(45) Date of Patent: Nov. 19, 2024

(54) COMPOSITION FOR FORMING AN ACTIVE MATERIAL COMPOSITE, AN ACTIVE MATERIAL COMPOSITE, AND A METHOD FOR PRODUCING AN ACTIVE MATERIAL COMPOSITE

(71) Applicant: NISSAN CHEMICAL CORPORATION, Tokyo (JP)

(72) Inventors: Takahiro Kaseyama, Funabashi (JP); Tatsuya Hatanaka, Funabashi (JP); Yuki Shibano, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 831 days.

(21) Appl. No.: 17/290,425

(22) PCT Filed: Oct. 3, 2019

(86) PCT No.: PCT/JP2019/039118
§ 371 (c)(1),
(2) Date: Apr. 30, 2021

(87) PCT Pub. No.: WO2020/090344
PCT Pub. Date: May 7, 2020

(65) Prior Publication Data
US 2021/0384489 A1 Dec. 9, 2021

(30) Foreign Application Priority Data

Nov. 2, 2018 (JP) .................................. 2018-206981

(51) Int. Cl.
| | | |
|---|---|---|
| *H01M 4/36* | (2006.01) | |
| *H01M 4/04* | (2006.01) | |
| *H01M 4/485* | (2010.01) | |
| *H01M 4/505* | (2010.01) | |
| *H01M 4/525* | (2010.01) | |
| *H01M 4/62* | (2006.01) | |
| *H01M 10/0525* | (2010.01) | |

(52) U.S. Cl.
CPC ............ *H01M 4/362* (2013.01); *H01M 4/04* (2013.01); *H01M 4/485* (2013.01); *H01M 4/505* (2013.01); *H01M 4/525* (2013.01); *H01M 4/622* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 11,251,435 B2 | 2/2022 | Shibano et al. | |
| 2009/0305132 A1 | 12/2009 | Gauthier et al. | |
| 2012/0100438 A1* | 4/2012 | Fasching ............ | H01M 4/0428 |
| | | | 429/246 |
| 2014/0015463 A1 | 1/2014 | Merkel et al. | |
| 2014/0154563 A1* | 6/2014 | Oguro ................... | H01M 4/62 |
| | | | 429/211 |
| 2015/0228982 A1* | 8/2015 | Shibano ................ | H01G 11/06 |
| | | | 252/511 |
| 2016/0200850 A1 | 7/2016 | Hatanaka et al. | |
| 2016/0204439 A1* | 7/2016 | Sonobe ................. | H01M 4/583 |
| | | | 524/45 |
| 2017/0338468 A1* | 11/2017 | Kim ..................... | H01M 4/0404 |
| 2018/0287192 A1* | 10/2018 | Fauler ................... | H01G 11/38 |

FOREIGN PATENT DOCUMENTS

| | | |
|---|---|---|
| CN | 103746094 A | 4/2014 |
| CN | 108292744 A | 7/2018 |
| JP | 2001-15111 A | 1/2001 |
| JP | 2008-542979 A | 11/2008 |
| JP | WO2013168785 A1 * | 11/2013 |
| JP | 2014-132559 A | 7/2014 |
| WO | 2013/168785 A1 | 11/2013 |
| WO | 2015/029949 A1 | 3/2015 |
| WO | WO2016/194747 A1 | 12/2016 |

OTHER PUBLICATIONS

International Search Report issued in PCT/JP2019/039118 (PCT/ISA/210), dated Dec. 17, 2019.
Written Opinion of the International Searching Authority issued in PCT/JP2019/039118 (PCT/ISA/237), dated Dec. 17, 2019.
Japanese Office Action for Japanese Application No. 2020-553706, dated Jul. 11, 2023, with an English translation.

* cited by examiner

*Primary Examiner* — Robert S Carrico
(74) *Attorney, Agent, or Firm* — Birch, Stewart, Kolasch & Birch, LLP

(57) ABSTRACT

Provided is a composition for forming an active material composite that gives an active material composite that can be used for an electrode in a lithium ion secondary battery and the like and that can improve battery cycle and rate characteristics.
A composition for forming an active material composite comprising at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer.

20 Claims, No Drawings

COMPOSITION FOR FORMING AN ACTIVE MATERIAL COMPOSITE, AN ACTIVE MATERIAL COMPOSITE, AND A METHOD FOR PRODUCING AN ACTIVE MATERIAL COMPOSITE

TECHNICAL FIELD

The present invention relates to a composition for forming an active material composite, an active material composite obtained from the composition, and a method for producing the active material composite.

BACKGROUND ART

In recent years, electronic devices have been becoming smaller and lighter, and, consequently, the batteries that power them also need to be smaller and lighter. Non-aqueous electrolyte-based secondary batteries such as lithium-ion batteries are commercially available as rechargeable batteries that are small, lightweight, and high-capacity, and are used in portable electronic and communication devices such as small video cameras, cell phones, and notebook computers.

Lithium-ion secondary batteries have high energy density and have excellent features such as higher capacity and operating voltage than other types of batteries. Their high energy density means, however, that, depending on the conditions of use, there is a risk of overheating and that accidents such as ignition may occur, and, therefore, high levels of safety are required. In particular, hybrid vehicles, which have been in the spotlight recently, need even higher energy density and power characteristics, and thus require even higher levels of safety.

Typically, a lithium-ion secondary battery is composed of a cathode, an anode and an electrolyte. When charging, lithium ions are released from the cathode active material into the electrolyte and intercalated into the anode active material such as carbon particles. When discharging, lithium ions are released from the anode active material into the electrolyte and intercalated into the cathode active material, allowing a current to be extracted to an external circuit. In this way, the lithium ions move back and forth between the cathode and the anode through the electrolyte inside the lithium-ion secondary battery, resulting in charging and discharging.

Meanwhile, as the performance of portable electronic devices improves, batteries with higher capacity are required, and materials such as Sn and Si, which have much higher capacities per unit weight than conventional carbon, are being actively researched as anode active materials. However, use of Si or a Si alloy as the anode active material causes a problem of poor cycle characteristics due to large volume expansion. Graphite is mixed in order to solve this problem, but if the graphite is distributed unevenly during mixing, the cycle characteristics (life time) may be degraded.

In recent years, as lithium-ion secondary batteries have become more versatile, there has been a need to further improve their rate characteristics. These secondary batteries are also being considered for use as high-power power sources, especially for plug-in hybrid vehicles, hybrid vehicles, and power tools. Batteries used as such high-power power sources are required to allow for high-speed charging and discharging.

The electrode active materials used in such batteries, such as electrode materials containing lithium phosphate compounds and lithium-containing metal oxides, which have the capability of reversibly deintercalating/intercalating lithium ions, suffer a problem of low conductivity. This causes an increase in resistance overpotential and activation overpotential when charging and discharging at a large current, resulting in reduced battery voltage and insufficient charging and discharging capacity in some cases. In response to this, an electrode material has been proposed in which, in order to increase the electron conductivity of the electrode material, the surface of electrode active material particles is covered with an organic compound serving as a carbon source, and then the organic compound is carbonized to form a carbonaceous film on the surface of the electrode active material, with the result that the carbon in the carbonaceous film is interposed as an electron conducting material (see, for example, Patent Document 1).

However, there is a need for further performance improvement in cycle and rate characteristics, and, moreover, the carbonization process above requires a heat treatment carried out at a high temperature of 500° C. or higher under an inert gas atmosphere and lasting for a long time.

PRIOR ART DOCUMENTS

Patent Documents

Patent Document 1: JP-A-2001-15111

SUMMARY

Problems to be Solved by the Invention

The present invention was made in consideration of the above circumstances, and it is an object of the present invention to provide, among others, a composition for forming an active material composite that gives an active material composite that can be used for electrodes of lithium-ion secondary batteries and the like and that can improve battery cycle and rate characteristics, an active material composite obtained from the composition, and a method for producing the active material composite.

Means for Solving the Problem

As a result of intensive research to solve the above problems, the present inventors found that a composition for forming an active material composite comprising at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer gives an active material composite that has a uniform coating layer containing a conductive material and the like on the surface of the active material particles and that has good conductivity and excellent durability, and, at the same time, provides a secondary battery with excellent cycle and rate characteristics when an electrode of the battery is formed using the active material composite. The present inventors also found that the active material composite above can be obtained using the composition for forming an active material composite above, simply by performing a simple drying operation, without carrying out a carbonization process, and completed the present invention.

That is, the present invention provides, among others, the following compositions for forming an active material composite, active material composites, and methods for producing the active material composites.

1. A composition for forming an active material composite comprising at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer.
2. The composition for forming an active material composite according to 1, wherein the active material is at least one selected from $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x\leq 2$).
3. The composition for forming an active material composite according to 1 or 2, wherein the conductive material is conductive carbon.
4. The composition for forming an active material composite according to 3, wherein the conductive carbon is a carbon nanotube.
5. An active material composite obtained from the composition for forming an active material composite according to any one of 1 to 4.
6. The active material composite according to 5, wherein a coating layer comprising a conductive material and a dispersant is formed on a surface of a particle of at least one active material selected from a metal, a metalloid, a metal alloy, a metal oxide, a metalloid oxide, a metal phosphate, a metal sulfide, and a metal nitride.
7. An active material composite comprising at least one active material selected from a metal, a metalloid, a metal alloy, a metal oxide, a metalloid oxide, a metal phosphate, a metal sulfide, and a metal nitride, a conductive material, and at least one dispersant selected from a vinyl polymer comprising a pendant oxazoline group and a triarylamine-based hyperbranched polymer.
8. The active material composite according to 7, wherein the active material is at least one selected from $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x\leq 2$).
9. The active material composite according to 7 or 8, wherein the conductive material is conductive carbon.
10. The active material composite according to 9, wherein the conductive carbon is a carbon nanotube.
11. A composition for forming an electrode, comprising the active material composite according to 5 to 10, a conductive aid, and a binder.
12. An electrode having an active material layer consisting of the composition for forming an electrode according to 11.
13. A secondary battery comprising the electrode according to 12.
14. A method for producing the composition for forming an active material composite according to any one of 1 to 4, comprising: preparing an active material dispersion comprising an active material and a solvent, and a conductive material dispersion comprising a conductive material, at least one dispersant selected from a vinyl polymer comprising a pendant oxazoline group, and a triarylamine-based hyperbranched polymer, and a solvent separately, and then mixing them.
15. A method for producing an active material composite comprising: mixing at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer to prepare a composition for forming an active material composite, and drying the composition.
16. The method for producing an active material composite according to 15, wherein the drying is performed by spray drying.
17. The method for producing an active material composite according to 15 or 16, wherein the active material is at least one selected from the group consisting of $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x\leq 2$).
18. The method for producing an active material composite according to any one of 15 to 17, wherein the conductive material is conductive carbon.
19. The method for producing an active material composite according to 18, wherein the conductive carbon is a carbon nanotube.
20. The method for producing an active material composite according to any one of 15 to 19, wherein the composition for forming an active material composite is prepared by preparing an active material dispersion comprising an active material and a conductive material dispersion comprising a conductive material and a dispersant separately, and then mixing them.

Effect of the Invention

According to the present invention, an active material composite in which the surface of the active material particles is coated with a coating layer comprising a conductive material and at least one dispersant selected from a vinyl polymer comprising a pendant oxazoline group and a triarylamine-based hyperbranched polymer can be easily obtained by using the above-mentioned composition for forming an active material composite. Also, a secondary battery with excellent cycle and rate characteristics can be fabricated using the active material composite obtained.

DESCRIPTION OF EMBODIMENTS

Hereinafter, the present invention will be described in more detail.

The composition for forming an active material composite of the present invention comprises at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer.

For the active material, various active materials conventionally used for an electrode for an energy storage device can be used, and specific examples thereof include the following.

Examples of metal active materials include Al, Sn, Zn and the like.

Examples of metalloid active materials include Si, Ge, As and the like.

Examples of metal alloy active materials include a Li—Al alloy, a Li—Mg alloy, a Li—Al—Ni alloy, a Na—Hg alloy, a Na—Zn alloy, and the like.

Examples of metal oxide active materials include $AlO_x$, $SnO_x$, $SbO_x$, $BiO_x$, $PbO_x$, $ZnO_x$, $CdO_x$, $InO_x$, $TiO_x$ and $GaO_x$ (wherein $0<x\leq2$), $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05\leq z\leq1.10$, and $0.5\leq y\leq1.0$), a ternary active material ($Li(Ni_aCo_bMn_c)O_2$ (wherein $0<a<1$, $0<b<1$, $0<c<1$, $a+b+c=1$)), tin silicate ($SnSiO_3$), lithium bismuthate ($Li_3BiO_4$), lithium zincate ($Li_2ZnO_2$), lithium titanate ($Li_4Ti_5O_{12}$) and the like.

Examples of metalloid oxide active materials include $SiO_x$, $GeO_x$, and $AsO_x$ (wherein $0<x\leq2$) and the like.

Examples of metal phosphate active materials include $LiFePO_4$ and the like.

Examples of metal sulfide active materials include $FeS_2$, $TiS_2$, $MoS_2$, $Li_2S$, lithium iron sulfide ($Li_xFeS_2$ (wherein $0<x\leq3$)) and lithium copper sulfide ($Li_xCuS$ (wherein $0<x\leq3$)) and the like.

Examples of metal nitride active materials include $Li_xM_yN$ (wherein M=Co, Ni, Cu, $0\leq x\leq3$, $0\leq y\leq0.5$, and x and y cannot be zero at the same time), lithium iron nitride ($Li_3FeN_4$) and the like.

Among these, preferable in the present invention are $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05\leq z\leq1.10$, and $0.5\leq y\leq1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x\leq2$); and $TiO_x$ (wherein $0<x\leq2$) is more preferable.

Furthermore, for $Li(Ni_aCo_bMn_c)O_2$, those satisfying $\frac{1}{3}\leq a<1$, $0<b\leq\frac{1}{3}$, $0<c\leq\frac{1}{3}$, and $a+b+c=1$ are even more preferable.

The $Li(Ni_aCo_bMn_c)O_2$ above can also be obtained commercially, and such commercial products include, for example, NCM111 (manufactured by Beijing Easping Material Technology; $a=\frac{1}{3}$, $b=\frac{1}{3}$, $c=\frac{1}{3}$), NCM523 (manufactured by Beijing Easping Material Technology; $a=0.5$, $b=0.2$, $c=0.3$), NCM622 (manufactured by Beijing Easping Material Technology; $a=0.6$, $b=0.2$, $c=0.2$), NCM811 (manufactured by Beijing Easping Material Technology, $a=0.8$, $b=0.1$, $c=0.1$) and the like.

The average particle diameter (primary particle diameter) of the active material is preferably 10 nm to 15 μm, and more preferably 20 nm to 8 μm. It is easier to increase the reaction area as an active material by using particles having small average primary particle diameters in this way. The average particle diameters above are values measured by scanning electron microscopy (SEM).

The amount of active material to be blended varies depending on the required electrical and thermal characteristics, slurry viscosity, manufacturing costs, and the like, but it is preferably 0.1 to 80% by mass, more preferably 1 to 60% by mass, and even more preferably 1 to 50% by mass, relative to the composition.

Examples of conductive materials include conductive carbons such as carbon black, acetylene black, ketjen black, channel black, furnace black, lamp black, thermal black, carbon black, carbon nanotubes (CNTs), natural graphite, artificial graphite, and carbon fibers, fluorocarbon, polyphenylene derivatives and the like. These can be used alone or in combination of two or more types as appropriate. In the present invention, from the perspective of coating the surface of the active material particles with conductive materials above, fibrous carbon is preferable, and carbon nanotubes are more preferable. In the present invention, carbon conductive materials in sheet form are excluded.

CNTs are typically produced by, for example, an arc discharge process, chemical vapor deposition (CVD) or laser ablation. The CNTs used in the present invention may be obtained by any method. CNTs are categorized as single-walled CNTs composed of a single cylindrically rolled graphene sheet (also abbreviated below as "SWCNTs"), double-walled CNTs composed of two concentrically rolled graphene sheets (also abbreviated below as "DWCNTs"), and multi-walled CNTs composed of a plurality of concentrically rolled graphene sheets (also abbreviated below as "MWCNTs"). In the present invention, SWCNTs, DWCNTs and MWCNTs may each be used alone or a plurality of these types of CNTs may be used in combination.

When synthesizing SWCNTs, DWCNTs and MWCNTs by the above methods, catalyst metals such as nickel, iron, cobalt and yttrium may remain present, and it is therefore necessary in some cases to carry out purification to remove these impurities. Acid treatment with nitric acid, sulfuric acid or the like and ultrasonic treatment are effective for removing the impurities. In acid treatment with nitric acid, sulfuric acid or the like, the n conjugated system making up the CNTs may be destroyed, resulting in a loss of inherent properties of the CNTs. Hence, it is desirable to purify the CNTs under suitable conditions prior to use.

Specific examples of CNTs that may be used in the present invention include CNTs synthesized by the super growth method (available from the New Energy and Industrial Technology Development Organization in the National Research and Development Agency), eDIPS-CNTs (available from the New Energy and Industrial Technology Development Organization in the National Research and Development Agency), the SWNT series (available under this trade name from Meijo Nano Carbon), the VGCF series (available under this trade name from Showa Denko KK), the FloTube series (available under this trade name from CNano Technology), AMC (available under this trade name from Ube Industries, Ltd.), the NANOCYL NC7000 series (available under this trade name from Nanocyl S.A.), Baytubes (available under this trade name from Bayer), GRAPHISTRENGTH (available under this trade name from Arkema), MWNT7 (available under this trade name from Hodogaya Chemical Co., Ltd.), Hyperion CNT (available under this trade name from Hyperion Catalysis International) and TC-2010 (available under this trade name from Toda Kogyo Corp.).

The amount of conductive material to be blended varies depending on the required electrical and thermal characteristics, slurry viscosity, manufacturing costs, and the like, and in the case of CNTs, may be any amount as long as at least a portion of the CNTs individually disperse, but it is preferably 0.0001 to 50% by mass, more preferably 0.001 to 20% by mass, and even more preferably 0.001 to 10% by mass, relative to the composition.

For the dispersant, at least one dispersant selected from a vinyl polymer comprising a pendant oxazoline group and a triarylamine-based hyperbranched polymer, preferably a dispersant consisting of a vinyl polymer comprising a pendant oxazoline group or a triarylamine-based hyperbranched polymer, is used. In the present invention, the dispersing ability, dispersion stabilizing ability and the like of the conductive material above during the preparation of the composition can be improved by inclusion of these dispersants. The above dispersant can, as appropriate, be selected from the dispersants known in the art, and examples include the vinyl polymers having a pendant oxazoline group described in WO 2015/029949, and hyperbranched polymers obtained by condensation polymerization of a triarylamine with an aldehyde and/or a ketone.

Examples of the vinyl polymer having a pendant oxazoline group (referred to below as, the "oxazoline polymer") include a polymer which is obtained by the radical polymerization of an oxazoline monomer having a group at position 2 that comprises a polymerizable carbon-carbon double bond as represented by formula (P) below, and which has repeating units that are bonded at position 2 of the oxazoline ring to the polymer backbone or to spacer groups.

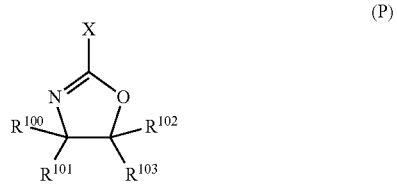

(P)

Here, X represents a group that comprises a polymerizable carbon-carbon double bond, and $R^{100}$ to $R^{103}$ are each, independently, a hydrogen atom, a halogen atom, an alkyl group of 1 to 5 carbon atoms that may have a branched structure, an aryl group of 6 to 20 carbon atoms, or an aralkyl group of 7 to 20 carbon atoms.

The group that comprises a polymerizable carbon-carbon double bond on the oxazoline monomer is not particularly limited, so long as it comprises a polymerizable carbon-carbon double bond. However, an open chain hydrocarbon group comprising a polymerizable carbon-carbon double bond is preferable. For example, alkenyl groups having from 2 to 8 carbon atoms, such as vinyl, allyl and isopropenyl groups, are preferred.

Examples of the halogen atom and the alkyl group of 1 to 5 carbon atoms that may have a branched structure include those mentioned above.

Specific examples of the aryl group of 6 to 20 carbon atoms include phenyl, xylyl, tolyl, biphenyl and naphthyl groups.

Specific examples of the aralkyl group of 7 to 20 carbon atoms include benzyl, phenylethyl and phenylcyclohexyl groups.

Specific examples of the oxazoline monomer having a group at position 2 that comprises a polymerizable carbon-carbon double bond represented by formula (P) include 2-vinyl-2-oxazoline, 2-vinyl-4-methyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, 2-vinyl-5-butyl-2-oxazoline, 2-isopropenyl-2-oxazoline, 2-isopropenyl-4-methyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline and 2-isopropenyl-5-butyl-2-oxazoline. In terms of availability, 2-isopropenyl-2-oxazoline is preferred.

Also, if an aqueous solvent is used for the solvent to be described below in the preparation of the composition for forming an active material composite, the oxazoline polymer above is preferably water-soluble.

Such a water-soluble oxazoline polymer may be a homopolymer of the oxazoline monomer of formula (P) above. However, to further increase solubility in water, the polymer is preferably one obtained by the radical polymerization of at least two types of monomer: the above oxazoline monomer, and a (meth)acrylic ester monomer having a hydrophilic functional group.

Illustrative examples of the (meth)acrylic monomer having a hydrophilic functional group include (meth)acrylic acid, 2-hydroxyethyl acrylate, methoxy polyethylene glycol acrylate, monoesters of acrylic acid with polyethylene glycol, 2-aminoethyl acrylate and salts thereof, 2-hydroxyethyl methacrylate, methoxy polyethylene glycol methacrylate, monoesters of methacrylic acid with polyethylene glycol, 2-aminoethyl methacrylate and salts thereof, sodium (meth)acrylate, ammonium (meth)acrylate, (meth)acrylonitrile, (meth)acrylamide, N-methylol (meth)acrylamide, N-(2-hydroxyethyl) (meth)acrylamide and sodium styrenesulfonate. These may be used singly, or two or more may be used in combination. Of these, methoxy polyethylene glycol (meth)acrylate and monoesters of (meth)acrylic acid with polyethylene glycol are preferred.

Concomitant use may be made of monomers other than the oxazoline monomer and the (meth)acrylic monomer having a hydrophilic functional group, to the extent that this does not adversely affect the ability of the oxazoline polymer to disperse the conductive material.

Illustrative examples of such other monomers include (meth)acrylic ester monomers such as methyl (meth)acrylate, ethyl (meth)acrylate, butyl (meth)acrylate, 2-ethylhexyl (meth)acrylate, stearyl (meth)acrylate, perfluoroethyl (meth)acrylate and phenyl (meth)acrylate; α-olefin monomers such as ethylene, propylene, butene and pentene; haloolefin monomers such as vinyl chloride, vinylidene chloride and vinyl fluoride; styrene monomers such as styrene and α-methylstyrene; vinyl carboxylate monomers such as vinyl acetate and vinyl propionate; and vinyl ether monomers such as methyl vinyl ether and ethyl vinyl ether. These may each be used singly, or two or more may be used in combination.

For the purpose of increasing the ability of the resulting oxazoline polymer to disperse the conductive material, the amount of the oxazoline monomer in the monomer ingredients used to prepare the oxazoline polymer is preferably at least 10% by mass, more preferably at least 20% by mass, and even more preferably at least 30% by mass. The upper limit of the amount of the oxazoline monomer in the monomer ingredients is 100% by mass, in which case a homopolymer of the oxazoline monomer is obtained.

For the purpose of increasing the water solubility of the resulting oxazoline polymer, the amount of the (meth)acrylic monomer having a hydrophilic functional group in the monomer ingredients is preferably at least 10% by mass, more preferably at least 20% by mass, and even more preferably at least 30% by mass.

As discussed above, the amount of the other monomers in the monomer ingredients is in a range that does not affect the ability of the resulting oxazoline polymer to disperse the conductive material, and this amount varies according to the types used and thus cannot be specified in a general way, but may be suitably set in a range of from 5 to 95% by mass, and preferably from 10 to 90% by mass.

The average molecular weight of the oxazoline polymer is not particularly limited, but the weight-average molecular weight is preferably from 1,000 to 2,000,000, and more preferably from 2,000 to 1,000,000.

The oxazoline polymer that may be used in the present invention can be synthesized by a known radical polymerization of the above monomers or may be acquired as a commercial product. Illustrative examples of such commercial products include Epocros WS-300 (manufactured by Nippon Shokubai Co., Ltd., solids concentration: 10% by mass, aqueous solution), Epocros WS-700 (manufactured by Nippon Shokubai Co., Ltd., solids concentration: 25% by mass, aqueous solution), Epocros WS-500 (manufactured by Nippon Shokubai Co., Ltd., solids concentration: 39% by mass, water/I-methoxy-2-propanol solution), poly(2-ethyl-2-oxazoline) (Aldrich), poly(2-ethyl-2-oxazoline) (Alfa Aesar) and poly(2-ethyl-2-oxazoline) (VWR International, LLC).

When the oxazoline polymer is commercially available as a solution, the solution may be used directly as is or may be used after replacing the solvent with a target solvent.

Specific examples of triarylamine-based hyperbranched polymers include the hyperbranched polymers represented by formulas (1) and (2) below obtained by the condensation polymerization of a triarylamine with an aldehyde and/or a ketone under acidic conditions.

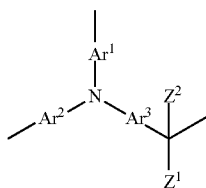
(1)

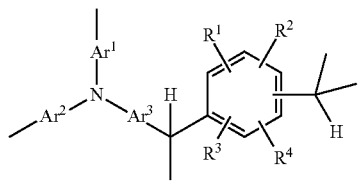
(2)

In formulas (1) and (2), $Ar^1$ to $Ar^3$ are each, independently, a divalent organic group represented by any one of formulas (3) to (7), and preferably a substituted or unsubstituted phenylene group represented by formula (3).

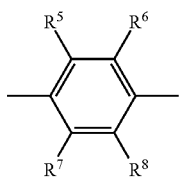
(3)

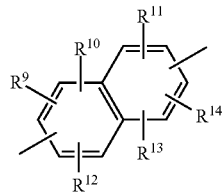
(4)

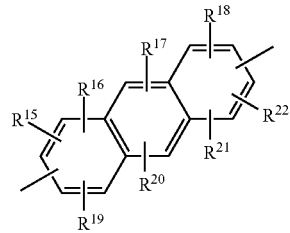
(5)

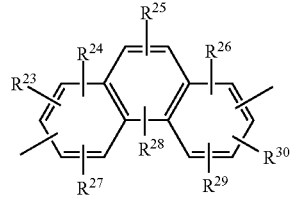
(6)

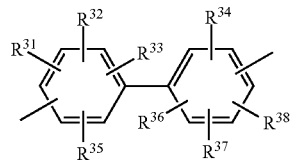
(7)

wherein $R^5$ to $R^{38}$ are each, independently, a hydrogen atom, a halogen atom, an alkyl group of 1 to 5 carbon atoms that may have a branched structure, an alkoxy group of 1 to 5 carbon atoms that may have a branched structure, a carboxyl group, a sulfo group, a phosphoric acid group, a phosphonic acid group, or a salt thereof.

In formulas (1) and (2), $Z^1$ and $Z^2$ are each, independently, a hydrogen atom, an alkyl group of 1 to 5 carbon atoms that may have a branched structure, or a monovalent organic group represented by any one of formulas (8) to (11), provided that $Z^1$ and $Z^2$ are not both alkyl groups; preferably, $Z^1$ and $Z^2$ are each, independently, a hydrogen atom, a 2- or 3-thienyl group or a group represented by formula (8); particularly preferably, either one of $Z^1$ and $Z^2$ is a hydrogen atom and the other one is a hydrogen atom, a 2- or 3-thienyl group, or a group represented by formula (8), in particular, one in which $R^{41}$ is a phenyl group or one in which $R^{41}$ is a methoxy group.

In cases where $R^{41}$ is a phenyl group, when the technique of introducing an acidic group following polymer production is used in the method of introducing an acidic group described below, the acidic group may be introduced onto this phenyl group.

Examples of the alkyl groups of 1 to 5 carbon atoms that may have a branched structure include the same as those exemplified above.

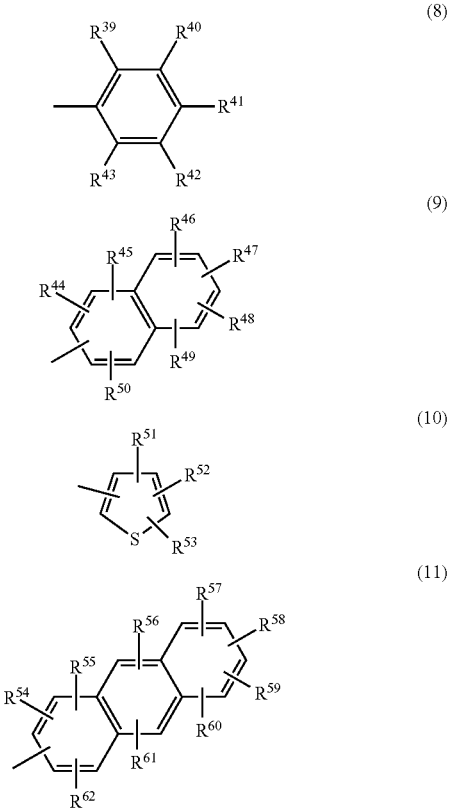

wherein R$^{39}$ to R$^{62}$ are each, independently, a hydrogen atom, a halogen atom, an alkyl group of 1 to 5 carbon atoms that may have a branched structure, a haloalkyl group of 1 to 5 carbon atoms that may have a branched structure, a phenyl group, OR$^{63}$, COR$^{63}$, NR$^{63}$R$^{64}$, COOR$^{65}$ (wherein R$^{63}$ and R$^{64}$ are each, independently, a hydrogen atom, an alkyl group of 1 to 5 carbon atoms that may have a branched structure, a haloalkyl group of 1 to 5 carbon atoms that may have a branched structure, or a phenyl group; and R$^{65}$ is an alkyl group of 1 to 5 carbon atoms that may have a branched structure, a haloalkyl group of 1 to 5 carbon atoms that may have a branched structure, or a phenyl group), a carboxyl group, a sulfo group, a phosphoric acid group, a phosphonic acid group, or a salt thereof.

In formulas (2) to (7), R$^{1}$ to R$^{38}$ are each, independently, a hydrogen atom, a halogen atom, an alkyl group of 1 to 5 carbon atoms that may have a branched structure, an alkoxy group of 1 to 5 carbon atoms that may have a branched structure, a carboxyl group, a sulfo group, a phosphoric acid group, a phosphonic acid group, or a salt thereof.

Here, examples of halogen atoms include fluorine, chlorine, bromine and iodine atoms.

Examples of alkyl groups of 1 to 5 carbon atoms that may have a branched structure include methyl, ethyl, n-propyl, isopropyl, n-butyl, sec-butyl, tert-butyl and n-pentyl groups.

Examples of alkoxy group of 1 to 5 carbon atoms that may have a branched structure include methoxy, ethoxy, n-propoxy, isopropoxy, n-butoxy, sec-butoxy, tert-butoxy and n-pentoxy groups.

Exemplary salts of carboxyl groups, sulfo groups, phosphoric acid groups and phosphonic acid groups include sodium, potassium and other alkali metal salts; magnesium, calcium and other Group 2 metal salts; ammonium salts; propylamine, dimethylamine, triethylamine, ethylenediamine and other aliphatic amine salts; imidazoline, piperazine, morpholine and other alicyclic amine salts; aniline, diphenylamine and other aromatic amine salts; and pyridinium salts.

In formulas (8) to (11) above, R$^{39}$ to R$^{62}$ are each, independently, a hydrogen atom, a halogen atom, an alkyl group of 1 to 5 carbon atoms that may have a branched structure, a haloalkyl group of 1 to 5 carbon atoms that may have a branched structure, a phenyl group, OR$^{63}$, COR$^{63}$, NR$^{63}$R$^{64}$, COOR$^{65}$ (wherein R$^{63}$ and R$^{64}$ are each, independently, a hydrogen atom, an alkyl group of 1 to 5 carbon atoms that may have a branched structure, a haloalkyl group of 1 to 5 carbon atoms that may have a branched structure, or a phenyl group; and R$^{65}$ is an alkyl group of 1 to 5 carbon atoms that may have a branched structure, a haloalkyl group of 1 to 5 carbon atoms that may have a branched structure, or a phenyl group), a carboxyl group, a sulfo group, a phosphoric acid group, a phosphonic acid group, or a salt thereof.

Here, examples of the haloalkyl group of 1 to 5 carbon atoms that may have a branched structure include difluoromethyl, trifluoromethyl, bromodifluoromethyl, 2-chloroethyl, 2-bromoethyl, 1,1-difluoroethyl, 2,2,2-trifluoroethyl, 1,1,2,2-tetrafluoroethyl, 2-chloro-1,1,2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropan-2-yl, 3-bromo-2-methylpropyl, 4-bromobutyl and perfluoropentyl groups.

Examples of the halogen atoms and the alkyl groups of 1 to 5 carbon atoms that may have a branched structure include the same as the groups exemplified for formulas (2) to (7) above.

Examples of aldehyde compounds that may be used to prepare the hyperbranched polymer include saturated aliphatic aldehydes such as formaldehyde, p-formaldehyde, acetaldehyde, propylaldehyde, butyraldehyde, isobutyraldehyde, valeraldehyde, caproaldehyde, 2-methylbutyraldehyde, hexylaldehyde, undecylaldehyde, 7-methoxy-3,7-dimethyloctylaldehyde, cyclohexanecarboxyaldehyde, 3-methyl-2-butyraldehyde, glyoxal, malonaldehyde, succinaldehyde, glutaraldehyde and adipinaldehyde; unsaturated aliphatic aldehydes such as acrolein and methacrolein; heterocyclic aldehydes such as furfural, pyridinealdehyde and thiophenealdehyde; aromatic aldehydes such as benzaldehyde, tolylaldehyde, trifluoromethylbenzaldehyde, phenylbenzaldehyde, salicylaldehyde, anisaldehyde, acetoxybenzaldehyde, terephthalaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthaldehyde, anthraldehyde and phenanthraldehyde; and aralkylaldehydes such as phenylacetaldehyde and 3-phenylpropionaldehyde. Of these, use of an aromatic aldehyde is preferred.

Examples of ketone compounds that may be used to prepare the hyperbranched polymer include alkyl aryl ketones and diaryl ketones, which include, for example, acetophenone, propiophenone, diphenyl ketone, phenyl naphthyl ketone, dinaphthyl ketone, phenyl tolyl ketone and ditolyl ketone.

The hyperbranched polymer that may be used in the present invention is obtained, for example, by the condensation polymerization of a triarylamine compound, such as the one represented by formula (A) below, that is capable of giving the triarylamine skeleton described above, with an aldehyde compound and/or a ketone compound, such as the one represented by formula (B) below, in the presence of an acid catalyst, as shown in Scheme 1 below.

In cases where a difunctional compound (C) such as a phthalaldehyde (e.g., terephthalaldehyde) is used as the aldehyde compound, not only does the reaction shown in Scheme 1 arise, the reaction shown in Scheme 2 below may also arise, giving a hyperbranched polymer having a cross-linked structure that results from the contribution of both of the two functional groups to the condensation reaction.

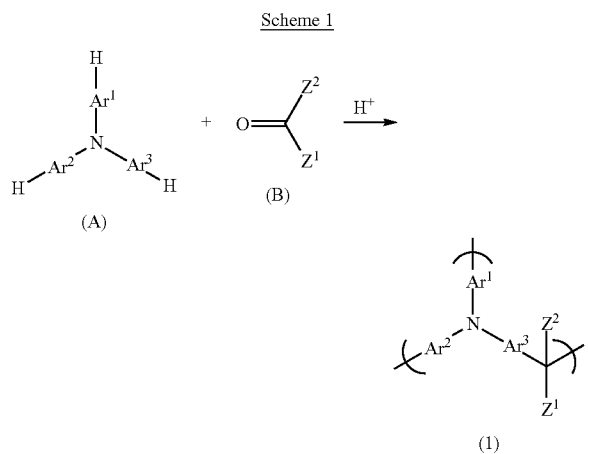

wherein $Ar^1$ to $Ar^3$ and $Z^1$ to $Z^2$ are the same as defined above.

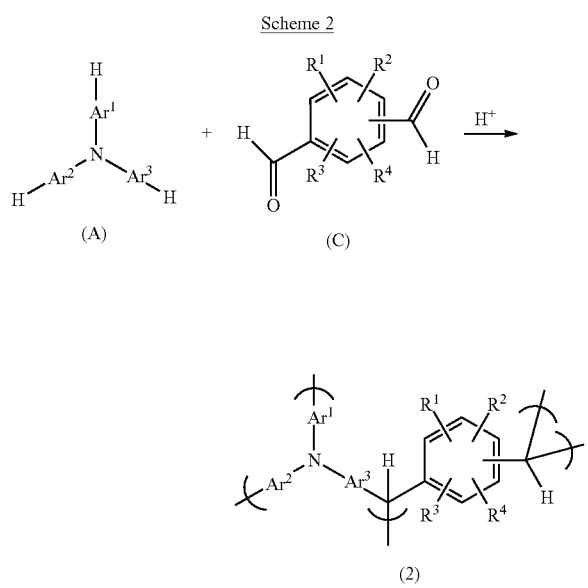

wherein $Ar^1$ to $Ar^3$ and $R^1$ to $R^4$ are the same as defined above.

In the condensation polymerization reaction above, the aldehyde compound and/or ketone compound may be used in a ratio of from 0.1 to 10 equivalents per equivalent of aryl groups on the triarylamine compound.

The acid catalyst used may be, for example, a mineral acid such as sulfuric acid, phosphoric acid or perchloric acid; an organic sulfonic acid such as p-toluenesulfonic acid or p-toluenesulfonic acid monohydrate; or a carboxylic acid such as formic acid or oxalic acid.

The amount of acid catalyst used, although variously selected according to the type thereof, is typically from 0.001 to 10,000 parts by mass, preferably from 0.01 to 1,000 parts by mass, and more preferably from 0.1 to 100 parts by mass, relative to 100 parts by mass of the triarylamine.

The condensation reaction described above may be carried out without a solvent, but it is typically carried out using a solvent. Any solvent that does not hinder the reaction may be used for this purpose. Examples include cyclic ethers such as tetrahydrofuran and 1,4-dioxane; amides such as N,N-dimethylformamide (DMF), N,N-dimethylacetamide (DMAc) and N-methyl-2-pyrrolidone (NMP); ketones such as methyl isobutyl ketone and cyclohexanone; halogenated hydrocarbons such as methylene chloride, chloroform, 1,2-dichloroethane and chlorobenzene; and aromatic hydrocarbons such as benzene, toluene and xylene. Cyclic ethers are particularly preferred. These solvents may be used singly, or a mixture of two or more may be used.

If the acid catalyst used is in liquid form such as formic acid, the acid catalyst may also fulfill the role of a solvent.

The reaction temperature during condensation is typically between 40° C. and 200° C. The reaction time may be variously selected according to the reaction temperature, but is typically from about 30 minutes to about 50 hours.

The weight-average molecular weight Mw of the polymer obtained as described above is typically from 1,000 to 2,000,000, and preferably from 2,000 to 1,000,000.

When acidic groups are introduced onto the hyperbranched polymer, this may be done by a method that involves first introducing the acidic groups onto aromatic rings of the above triarylamine compound, aldehyde compound or ketone compound serving as the polymer starting materials, then using this to synthesize the hyperbranched polymer; or by a method that involves treating the hyperbranched polymer following synthesis with a reagent that is capable of introducing acidic groups onto its aromatic rings. For the purpose of ease and simplicity of production, use of the latter approach is preferred.

In the latter approach, the technique used to introduce acidic groups onto the aromatic rings is not particularly limited, and may be suitably selected from among various methods known in the art, according to the type of acidic group.

For example, in cases where sulfo groups are introduced, use may be made of a method that involves sulfonation using an excess amount of sulfuric acid.

The average molecular weight of the hyperbranched polymer is not particularly limited, but the weight average molecular weight is preferably from 1,000 to 2,000,000, and more preferably from 2,000 to 1,000,000.

In the present invention, the weight average molecular weight is a measured value (polystyrene equivalent) obtained by gel permeation chromatography.

Specific examples of the hyperbranched polymer include, but are not limited to, those represented by the following formulas.

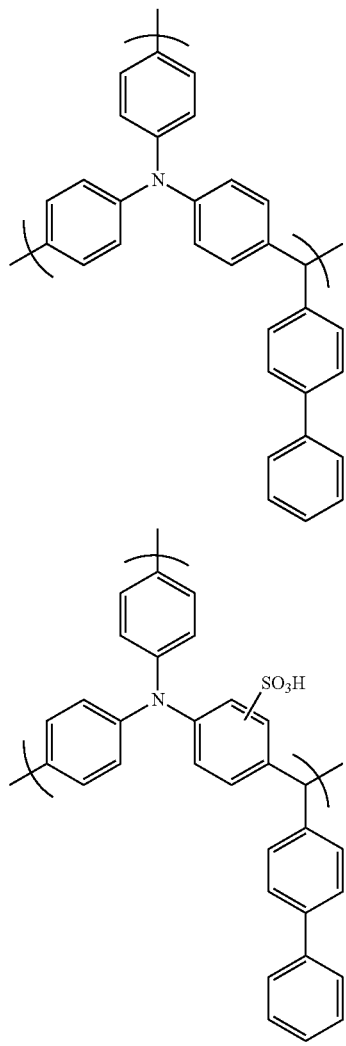

In the present invention, each of the dispersants discussed above may be used singly, or two or more may be used in combination.

The amount of dispersant to be blended is not particularly limited, provided that it results in a concentration that enables the conductive material to be dispersed in the solvent, but is preferably from 0.001 to 30% by mass, and more preferably from 0.002 to 20% by mass, relative to the composition. The mixing ratio of the conductive material to the dispersant, expressed as a mass ratio, is preferably from about 1,000:1 to about 1:100.

The solvent (dispersing medium) that may be used to prepare the composition for forming an active material composite above is not particularly limited, as long as it is conventionally used to prepare a dispersion comprising a conductive material such as CNTs, and examples include water and the following organic solvents: ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These solvents may be used singly, or a mixture of two or more may be used.

In particular, when CNTs are used as the conductive material, from the perspective of being able to increase the proportion of CNTs that are individually dispersed, water, NMP, DMF, THF, methanol, isopropanol and cyclohexanone are preferable. These solvents may be used singly, or a mixture of two or more may be used.

When a spray drying method, described below, is used in the production of the active material composite, an alcohol such as methanol or isopropanol, or water is preferable because the solvent needs to be volatilized instantly, and water is more preferable from the perspective of safety during production.

In addition, the composition for forming an active material composite may comprise a matrix polymer, if necessary.

Illustrative examples of the matrix polymer include the following thermoplastic resins: fluoropolymers such as polyvinylidene fluoride (PVdF), polytetrafluoroethylene (PTFE), tetrafluoroethylene-hexafluoropropylene copolymers, vinylidene fluoride-hexafluoropropylene copolymers (P(VDF-HFP)) and vinylidene fluoride-chlorotrifluoroethylene copolymers (P(VDF-CTFE)); polyolefin resins such as polyvinylpyrrolidone, ethylene-propylene-diene ternary copolymers, polyethylene (PE), polypropylene (PP), ethylene-vinyl acetate copolymers (EVA) and ethylene-ethyl acrylate copolymers (EEA); polystyrene resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS) and styrene-butadiene rubbers; polycarbonate resins; vinyl chloride resins; polyamide resins; polyimide resins; (meth)acrylic resins such as polyacrylic acid, ammonium polyacrylate, sodium polyacrylate and polymethyl methacrylate (PMMA); polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate; polyphenylene ether resins; modified polyphenylene ether resins; polyacetal resins; polysulfone resins; polyphenylene sulfide resins; polyvinyl alcohol resins; polyglycolic acids; modified starches; cellulose acetate, carboxymethyl cellulose, cellulose triacetate; chitin and chitosan; and lignin; the following electrically conductive polymers: polyaniline and emeraldine base (the semi-oxidized form of polyaniline); polythiophene; polypyrrole; polyphenylene vinylene; polyphenylene; and polyacetylene; and the following thermosetting or photocurable resins: epoxy resins, urethane acrylate, phenolic resins, melamine resins, urea resins and alkyd resins. Because it is desirable to use water as the solvent in the composition for forming an active material composite of the present invention, the matrix polymer is preferably a water-soluble polymer such as polyacrylic acid, ammonium polyacrylate, sodium polyacrylate, sodium carboxymethyl cellulose, water-soluble cellulose ethers, sodium alginate, polyvinyl alcohol, polystyrene sulfonic acid or polyethylene glycol. Polyacrylic acid, ammonium polyacrylate, sodium polyacrylate and sodium carboxymethyl cellulose are particularly preferred.

The matrix polymer may be acquired as a commercial product. Illustrative examples of such commercial products include Aron A-10H (polyacrylic acid; available from Toagosei Co., Ltd. as an aqueous solution having a solids concentration of 26% by mass), Aron A-30 (ammonium polyacrylate; available from Toagosei Co., Ltd. as an aqueous solution having a solids concentration of 32% by mass), sodium polyacrylate (Wako Pure Chemical Industries Co., Ltd.; degree of polymerization: 2,700 to 7,500), sodium carboxymethyl cellulose (Wako Pure Chemical Industries, Ltd.), sodium alginate (Kanto Chemical Co., Ltd.; extra pure reagent), the Metolose SH Series (hydroxypropylmethyl cellulose, from Shin-Etsu Chemical Co., Ltd.), the Metolose SE Series (hydroxyethylmethyl cellulose, from: Shin-Etsu Chemical Co., Ltd.), JC-25 (a fully saponified polyvinyl alcohol, from Japan Vam & Poval Co., Ltd.), JM-17 (an intermediately saponified polyvinyl alcohol, from Japan Vam & Poval Co., Ltd.), JP-03. (a partially saponified polyvinyl alcohol, from Japan Vam & Poval Co., Ltd.) and polystyrenesulfonic acid (from Aldrich Co., solids concentration: 18% by mass, aqueous solution).

The amount of matrix polymer to be blended is not limited, but it is preferably 0.0001% to 99% by mass, and more preferably 0.001% to 90% by mass relative to the composition.

The method of producing the composition for forming an active material composite is not particularly limited, and it can be produced by mixing each of the components above in a certain ratio, but in the present invention, the composition for forming an active material composite is preferably produced by separately preparing an active material dispersion comprising an active material and a solvent, and a conductive material dispersion comprising a conductive material, a dispersant, and a solvent and then mixing the two dispersions. This allows an active material composite to be obtained in which the dispersed conductive material covers the surface of the active material particles. If the matrix polymer above is used, it can be blended into the conductive material dispersion.

At this time, in cases such as when either the active material or the conductive material is mixed in power form rather than in the form of a dispersion, or when the active material and the conductive material are dry mixed and then a dispersing medium is added to this dry mixture to prepare a dispersion, it may result in a non-uniform active material composite having a structure in which the conductive agent is attached to aggregates of fine particles due to the fine particles or the conductive agent not being dispersed, or in an active material composite having a structure in which aggregates of the conductive agent and aggregates of the fine particles are localized separately. In order to obtain the active material composite of the present invention, therefore, it is preferable to prepare a dispersion of the active material and a dispersion of the conductive material separately, and mix the dispersions.

The method of preparing the active material dispersion is not particularly limited, and the active material dispersion can be prepared by adding the active material above to a certain solvent and dispersing it. If necessary, the dispersion treatment described below may be performed in order to efficiently disperse the active material in the solvent.

The method of preparing the conductive material dispersion is not particularly limited, and the dispersion may be prepared by mixing, in any order, a conductive material such as CNTs, a dispersant, and if necessary, a solvent (dispersing medium), and a matrix polymer.

At this time, the mixture is preferably subjected to dispersion treatment. Such treatment enables the proportion of the conductive material such as CNTs that is dispersed to be further increased. Examples of dispersion treatments include mechanical treatment in the form of wet treatment using, for example, a ball mill, bead mill or jet mill, or in the form of ultrasonic treatment using a bath-type or probe-type sonicator. Wet treatment using a jet mill and ultrasonic treatment are preferred.

The dispersion treatment may be carried out for any length of time, although a period of from about 1 minute to about 10 hours is preferred, and a period of from about 5 minutes to about 5 hours is even more preferred. If necessary, heat treatment may be carried out at this time.

The matrix polymer above may be added later to a mixture obtained in advance by mixing the conductive material, dispersant, and solvent and dispersing the conductive material in the solvent.

The active material composite of the present invention can be produced by drying the above composition for forming an active material composite using appropriate drying means. In this case, in the resulting active material composite, the surface of the particles of the active material has a coating layer in which the conductive material is dispersed with a dispersant.

In the present invention, the active material composite can be produced by the simple process of drying, and an active material composite with excellent characteristics can be obtained more easily than when a conventional carbonization process, which requires heat treatment at 500° C. or higher, is conducted.

As for the method of drying the composition for forming an active material composite, any drying method known in the art can be adopted and there are no particular limitations. For example, in addition to natural drying, it may be dried by heating in the air, in an inert gas such as nitrogen, or in a vacuum, using a heating device such as a hot plate, an oven or the like, but in the present invention, a spray drying method may be suitably adopted for the purpose of obtaining fine, spherical particles.

The drying conditions can be set as appropriate depending on the compositional makeup and amount of the target composition, the equipment used and the like, and are not particularly limited. When drying in the air using a heating device such as a dryer, a vacuum dryer, a hot plate and an oven, for example, the drying temperature is preferably 80 to 250° C., and more preferably 120 to 200° C. The drying time is preferably 0.01 to 24 hours, and more preferably 0.1 to 2 hours. The spray drying method will be described in detail below.

The spray drying method is a method of obtaining spherical particles by atomizing a liquid and drying it with hot air in a short time. Commercially available spray dryers can be used for the spray drying method, and either a nozzle type dryer or a disc type (rotary atomizer type) dryer can be used, but in the present invention, a fluid spray type (fluid nozzle spray type) spray drying method is particularly suitable. The fluid spray drying method is a method involving the jetting of compressed air to turn the fluid into a fine mist, which is then subjected to warm air drying, and allows finer secondary particles to be obtained compared to mechanical granulation and drying methods such as those that use a rotary atomizer. There are two-fluid methods, four-fluid methods, and the like, depending on the number of spray nozzles, and any of these methods can be used in the present invention. The conditions for spray drying the dispersion of particles by a spray drying method (primary particle concentration, organic matter concentration, dispersion flow rate, drying gas flow rate, drying temperature and the like) are set, as appropriate, so that the average particle diameter of the granulated particles will be within a certain range, depending on the structure of the spray drying equipment and the like.

Examples of the above spray dryers that may be used include devices using two-fluid nozzles, such as the Pulvis Mini Spray GB210-A spray dryer manufactured by Yamato Scientific Co., Ltd., and the RJ-10, RJ-25, RJ-50, and TJ-100 spray dryers manufactured by Ohkawara Kakohki Co., Ltd. and devices using four-fluid nozzles, such as the MDL-050B, MDL-050BM, MDL-015CM-H, and MDL-015MGC spray dryers manufactured by Fujisaki Electric Co., Ltd.

When the active material composite is produced by a spray-drying method, if the resulting composite is not sufficiently dried, it may be further dried using a heating device such as a dryer, a vacuum dryer, a hot plate and an oven as described above.

The average particle diameter of the active material composite thus obtained is preferably 0.1 to 20 μm, more preferably 1 to 10 μm, from the perspective of the dispersibility and fillability of the electrode slurry. The average particle diameter above is a value measured by scanning electron microscopy.

In the active material composite obtained by using the composition for forming an active material composite, the surface of the particles of the active material has a coating layer comprising a conductive material and a dispersant, as described above.

In this case, the surface of the particles of the above active material is coated with the conductive material dispersed by the dispersant. If the conductive material is present in an aggregated state, uneven electrical resistance may result in the composite, and in some cases, it may cause a decrease in conductivity of the composite as a whole. By contrast, if the conductive material is present in a state of dispersion in the composite and covers the surface of the particles of the active material, there will be no unevenness in electrical resistance in the composite, and there will be no adverse effects such as reduced conductivity. As for the definition of dispersion here, carbon nanotubes are described as being dispersed if they are evenly scattered in the composite, whether they are disentangled individually in a carbon nanotube assembly, or several of them are clustered together to form a bundle, or whether they are a mixture of single tubes and bundles of various thicknesses. The surface of the particles does not have to be completely covered, and it only needs to be covered to the extent that conductive paths can be formed between particles. For example, the particles may be coated with a conductive agent in a mesh-like pattern.

The active material composite produced using the production method of the present invention by itself allows electrical conductivity to be greatly improved because the surface of the active material particles has a coating layer in which the conductive material is dispersed together with a dispersant. Furthermore, since the conductive material is uniformly dispersed, it improves performance without the need for carbonization treatment unlike conventional methods, thus simplifying the manufacturing process.

The present invention also provides a composition for forming an electrode using the above active material composite. The composition for forming an electrode can be used for a positive electrode and a negative electrode depending on the selection of the type of active material, and comprises the above active material composite, a conductive aid, and a binder.

Examples of the above conductive aid include carbon materials such as graphite, carbon black, acetylene black, vapor grown carbon fiber (VGCF), carbon nanotubes, carbon nanohorns, and graphene, and conductive polymers such as polyaniline, polypyrrole, polythiophene, polyacetylene, and polyacene. A single type of conductive aid may be used alone or two or more types may be used in combination.

The amount of the conductive aid to be blended is not particularly limited, but is preferably 1 to 20 parts by mass, and more preferably 2 to 12 parts by mass, relative to 100 parts by mass of the active material composite. Setting the amount of the conductive aid blended within the ranges above enables good electrical conductivity to be obtained.

The binder described above can be selected from known materials and is not particularly limited, but in the present invention, a non-aqueous binder can be suitably used. Examples of binders that can be used in the present invention include polyvinylidene fluoride (PVdF), polytetrafluoroethylene, tetrafluoroethylene-hexafluoropropylene copolymer, vinylidene fluoride-hexafluoropropylene copolymer (P(VDF-HFP)), vinylidene fluoride-chlorotrifluoroethylene copolymer (P(VDF-CTFE)), polyvinyl alcohol, polyimide, ethylene-propylene-diene ternary copolymer, styrene-butadiene rubber, carboxymethyl cellulose (CMC), polyacrylic acid (PAA), polyaniline, polyvinylpyrrolidone, tetrafluoroethylene, polyethylene and polypropylene. These can be used alone or two or more of them can be used in combination.

The amount of the binder to be blended is not particularly limited, but is preferably 1 to 20 parts by mass, and more preferably 2 to 15 parts by mass relative to 100 parts by mass of the active material composite. Setting the amount of the binder to be blended within the ranges above allows good adhesion to a current collecting substrate to be obtained without lowering capacity.

The binder can be dissolved in a solvent if necessary, in which case, solvents that may be used include, for example, N-methyl-2-pyrrolidone (NMP), dimethyl sulfoxide, ethylene carbonate, propylene carbonate, dimethyl carbonate, diethyl carbonate, methyl ethyl carbonate, γ-butyrolactone, tetrahydrofuran, dioxolane, sulfolane, dimethylformamide, and dimethylacetamide.

In the composition for forming an electrode of the present invention, for the purpose of further improving the conductivity of the active material layer, the conductive material described above can be further added in the process of mixing the active material composite with a conductive aid and a binder.

When the conductive material is further added, the amount added is 0.1 to 20 parts by mass, more preferably 0.1 to 5 parts by mass, relative to 100 parts by mass of the active material composite above.

The electrode of the present invention has an active material layer (thin film) composed of the composition for forming an electrode described above on a substrate that serves as a current collector, or is a thin film formed solely from the composition for forming an electrode.

When the active material layer is formed on a substrate, methods of forming the active material layer include methods (dry processes) that involve pressing the composition for forming an electrode prepared without using a solvent onto the substrate, or methods (wet processes) that involve preparing the composition for forming an electrode using a solvent and then coating a current collector with it and drying it. These methods are not particularly limited, and various conventionally known methods can be used. Examples of wet processes include various printing methods such as offset printing and screen printing, dip coating, spin coating, bar coating, slit coating, and inkjet methods, using a varnish composed of a solution or a suspension of a material comprising the above active material composite in an organic solvent.

Examples of the substrates used for the electrode discussed above include substrates of metals such as platinum, gold, iron, stainless steel, copper, aluminum, and lithium, substrates of alloys consisting of any combination of these metals, substrates of oxides such as indium tin oxide (ITO), indium zinc oxide (IZO), and antimony tin oxide (ATO), and substrates of carbons such as glassy carbon, pyrolytic graphite, and carbon felt.

When forming a thin film solely from the composition for forming an electrode described above, a thin film may be formed, as appropriate, by the above wet or dry methods, on a substrate that allows peeling after the formation of the thin film, or a method may be employed that involves spreading the composition for forming an electrode thinly on a substrate using a glass rod or the like. For the substrate, a substrate that does not adhere to a thin film, such as a glass plate, can be used, and even a substrate that does adhere to a thin film can be used as long as the surface of the substrate has been subjected to treatment (such as attaching release paper or forming a release layer) for enabling the thin film to be peeled off.

The film thickness of the above active material layer (thin film) is not particularly limited, but is preferably about 0.01 to about 1,000 μm, and more preferably about 1 to about 100 μm. When the thin film by itself is used as an electrode, its film thickness is preferably 10 μm or greater.

For the purpose of further reducing the elution of the active material contained in the electrode, the active material layer (thin film) may further comprise a polyalkylene oxide and an ion conducting salt, or the electrode may be coated with a protective film. The above protective film preferably comprises a polyalkylene oxide and an ion conducting salt.

The polyalkylene oxide is not particularly limited, but polyethylene oxide, polypropylene oxide and the like are preferred.

The number average molecular weight of the polyalkylene oxide is preferably 300,000 to 900,000, and more preferably, 500,000 to 700,000. The number average molecular weight is a polystyrene equivalent measured by gel permeation chromatography (GPC) using tetrahydrofuran as a solvent.

Examples of the ion conducting salt above include lithium bis(trifluoromethanesulfonyl)imide (LiTFSI), lithium bis(pentafluoroethanesulfonyl)imide (LiBETI), lithium trifluoromethanesulfonate ($LiCF_3SO_3$), lithium perchlorate ($LiClO_4$), lithium tetrafluoroborate ($LiBF_4$), and lithium hexafluorophosphate ($LiPF_6$). The ion conducting salt is preferably contained in an amount of 5 to 50 parts by mass per 100 parts by mass of the polyalkylene oxide.

The protective film above can be formed, for example, by applying a composition comprising a polyalkylene oxide, an ion conducting salt, and a solvent, by dipping or other methods, to a substrate on which the active material layer (thin film) above has been formed and then drying at 40 to 60° C. for 30 to 120 minutes.

Acetonitrile, dichloromethane and the like are preferable as the solvent above.

The thickness of the protective film is not particularly limited, but is preferably about 10 to about 1,000 μm, and more preferably about 50 to about 500 μm.

The secondary battery of the present invention comprises the electrode described above, and more specifically, the battery at least comprises a pair of electrodes consisting of positive and negative electrodes, a separator interposed between these electrodes, and an electrolyte, wherein at least one of the positive and negative electrodes is composed of the electrode described above. Other components of the battery device can be selected from those conventionally known in the art.

Examples of materials used for the separator above include porous polyolefin, polyamide, and polyester.

For the electrolyte, an electrolyte solution comprising an electrolyte salt, which serves as the main body of ion conduction, a solvent and the like can be used suitably for the purpose of easily achieving sufficient performance for practical use.

Examples of the above electrolyte salt include lithium salts such as $LiPF_6$, $LiBF_4$, $LiN(C_2F_5SO_2)_2$, $LiAsF_6$, $LiSbF_6$, $LiAlF_4$, $LiGaF_4$, $LiInF_4$, $LiClO_4$, $LiN(CF_3SO_2)_2$, $LiCF_3SO_3$, $LiSiF_6$, and $LiN(CF_3SO_2)(C_4F_9SO_2)$, metal iodides such as LiI, NaI, KI, CsI, and $CaI_2$, iodide salts of quaternary imidazolium compounds, iodide and perchlorate salts of tetraalkylammonium compounds, and metal bromides such as LiBr, NaBr, KBr, CsBr, and $CaBr_2$. These electrolyte salts may be used alone or in mixtures of two or more types.

The solvent above is not limited as long as it does not degrade performance by causing corrosion or decomposition of materials that make up the battery and dissolves the electrolyte salt above. Examples of non-aqueous solvents that can be used include cyclic esters such as ethylene carbonate, propylene carbonate, butylene carbonate, and γ-butyrolactone, ethers such as tetrahydrofuran and dimethoxyethane, and chain esters such as dimethyl carbonate, diethyl carbonate, and ethyl methyl carbonate. These solvents can be used alone or in mixtures of two or more types.

Batteries produced using the composition for forming an electrode of the present invention will have superior cycle and rate characteristics compared to typical secondary batteries.

The form of the secondary battery and the type of electrolyte are not particularly limited, and any of the following forms may be used: a lithium-ion battery, a nickel-hydrogen battery, a zinc-carbon battery, an air battery and the like. However, a lithium-ion battery is suitable. The lamination method and production method are also not particularly limited.

EXAMPLES

Examples and Comparative Examples are given below to more fully illustrate the invention, although the invention is not limited by these Examples. The measuring instruments used in the Examples were as follows.

<Probe-Type Ultrasonicator>
Instrument: UIP1000, manufactured by Hielscher Ultrasonics GmbH
<Spray Dryer>
Instrument: Pulvis Mini Spray GB210-A spray dryer, manufactured by Yamato Scientific Co., Ltd.
<Scanning Electron Microscope>
Instrument: JSM-7400F field emission scanning electron microscope, manufactured by JEOL, Ltd.
Particles were observed at a magnification of ×2,000, and the diameters of 50 particles were measured to obtain the number average particle diameter.
<Planetary Centrifugal Mixer>
Instrument: ARE-310 Thinky Mixer, manufactured by Thinky Corporation <Roll Press>

Instrument: SA-602 high pressure/hot roll press, manufactured by Takumi Giken

<Coin Cell Crimper>

Instrument: CR 2032 manual coin cell crimper, from Hohsen Corp.

<Micrometer>

Instrument: IR54, manufactured by Mitutoyo Corporation

<Charge/Discharge Measurement System>

Instrument: TOSCAT 3100, manufactured by Toyo System Co., Ltd.

[1] Production and Evaluation of Lithium-Ion Batteries—1

(1) Preparation of Conductive Material Dispersions

Example 1-1 Preparation of Conductive Material Dispersion A2

The following were mixed together: 2.0 g of the oxazoline polymer-containing aqueous solution Epocros WS-700 (Nippon Shokubai Co., Ltd.; solids concentration: 25 mass %; weight-average molecular weight: $4 \times 10^4$; amount of oxazoline groups: 4.5 mmol/g) as the dispersant, and 47.5 g of distilled water, in addition to which 0.5 g of MWCNTs (TC-2010, manufactured by Toda Kogyo Corp.) as the conductive material was mixed. The resulting mixture was subjected to ultrasonic treatment at room temperature for 30 minutes using a probe-type ultrasonicator, to obtain Conductive Material Dispersion A1, a black, uniform dispersion of MWCNTs with no precipitates.

To 50 g of the obtained Conductive Material Dispersion A1, 0.88 g of Epocros WS-700 (Nippon Shokubai Co., Ltd.; solids concentration: 25 mass %; weight-average molecular weight: $4 \times 10^4$; amount of oxazoline groups: 4.5 mmol/g) and 49.1 g of distilled water were added and stirred to obtain Conductive Material Dispersion A2 (solids concentration: 1.22 mass %).

Example 1-2 Preparation of Conductive Material Dispersion A3

Conductive Material Dispersion A3 was obtained by the same method as in Example 1-1, except that the MWCNTs were replaced with AMC (manufactured by Ube Industries, Ltd.).

Comparative Example 1-1 Preparation of Conductive Material Dispersion A4

0.36 g of polyvinyl alcohol JP-18 (partially saponified polyvinyl alcohol, manufactured by Japan Vam & Poval Co., Ltd.) as a dispersant was dissolved in 49.39 g of distilled water, and 0.25 g of MWCNTs (TC-2010, manufactured by Toda Kogyo Corp.) was added to the solution. The resulting mixture was subjected to ultrasonic treatment at room temperature for 30 minutes using a probe-type ultrasonicator, to obtain Conductive Material Dispersion A4 (solids concentration: 1.22 mass %), a black, uniform dispersion of MWCNTs with no precipitates.

Comparative Example 1-2 Preparation of Conductive Material Dispersion A5

Conductive Material Dispersion A5 was obtained by the same method as in Comparative Example 1-1, except that the MWCNTs were replaced with AMC (manufactured by Ube Industries, Ltd.).

(2) Production of Active Material Composites

Example 2-1 Production of Active Material Composite P1

10 g of anatase type titanium dioxide (Cat No. 637254, manufactured by Sigma-Aldrich, primary particle diameter: 25 nm or less) was mixed with 490 g of water. The resulting mixture was subjected to ultrasonic treatment at room temperature for 30 minutes using a bath-type ultrasonicator to obtain a white active material dispersion. To this dispersion, 105 g of Conductive Material Dispersion A2, produced in Example 1-1, and 499 g of distilled water were mixed. The resulting mixture was subjected to ultrasonic treatment at room temperature for 30 minutes to obtain a black dispersion (a composition for forming an active material composite). Then, the dispersion obtained was dried using a spray dryer. The drying conditions were as follows: drying gas: air, inlet temperature: 210° C., atomizing air pressure: 0.1 MPa, aspirator flow rate: 0.50 m³/min, and mixture feed rate: 3.5 g/min. The outlet temperature was 85 f 3° C. The dispersion was dried to obtain a gray solid. The solid obtained was further dried using a dryer (150° C., 2 hours) to obtain Active Material Composite P1.

The average particle diameter of the obtained Active Material Composite P1 was 5.0 μm.

Example 2-2 Production of Active Material Composite P2

Active Material Composite P2 was produced in the same way as in Example 2-1, except that A3, prepared in Example 1-2, was used instead of Conductive Material Dispersion A2, prepared in Example 1-1.

The average particle diameter of the obtained Active Material Composite P2 was 3.4 μm.

Comparative Example 2-1 Production of Active Material Composite P3

Active Material Composite P3 was produced in the same way as in Example 2-1, except that A4, prepared in Comparative Example 1-1, was used instead of Conductive Material Dispersion A2, prepared in Example 1-1.

The average particle diameter of the obtained Active Material Composite P3 was 5.8 μm.

Comparative Example 2-2 Production of Active Material Composite P4

Active Material Composite P4 was produced in the same way as in Example 2-1, except that A5, prepared in Comparative Example 1-2, was used instead of Conductive Material Dispersion A2, prepared in Example 1-1.

The average particle diameter of the obtained Active Material Composite P4 was 3.9 μm.

(3) Production of Electrodes and Lithium-Ion Batteries

Example 3-1

2.06 g of Active Material Composite P1, produced in Example 2-1 above, 0.048 g of acetylene black (AB, manufactured by Denki Kagaku Kogyo K.K.) as a conductive aid, and 2.88 g of an NMP solution of PVdF (solids concentration: 12 mass %, manufactured by Kishida Chemical Co., Ltd.) as a binder were mixed in a mass ratio of 86:2:12. In addition, 3.49 g of NMP was mixed to achieve a solids concentration of 30 mass %. A slurry for forming an electrode (anode slurry) was produced by mixing this in a planetary centrifugal mixer (2,000 rpm, twice for 10 minutes each). This was spread evenly on an aluminum foil (1085, manufactured by UACJ Foil Corporation, base material thickness: 15 μm) by a doctor blade method (wet film thickness: 100 μm), and subsequently dried at 80° C. for 30 minutes and then at 120° C. for 30 minutes to form an active material layer. This was crimped using a roll press to produce Electrode C1 (film thickness: 40 μm).

The electrode obtained was die cut into a disk having a diameter of 10 mm, measured for mass, vacuum dried at 120° C. for 12 hours, and transferred into a glove box filled with argon.

A stack of six pieces of lithium foil (manufactured by Honjo Chemical Corporation; thickness: 0.17 mm) that had been die-cut to a diameter of 14 mm was set on a 2032 coin cell (manufactured by Hohsen Corporation) cap to which a washer and a spacer had been welded, and one piece of separator (2400, from Celgard KK) die-cut to a diameter of 16 mm that had been impregnated for at least 24 hours with an electrolyte solution (manufactured by Kishida Chemical Co., Ltd.; an ethylene carbonate:diethyl carbonate=1:1 (volume ratio) solution containing 1 mol/L of lithium hexafluorophosphate as the electrolyte) was laid on the foil. Electrode C1 was then placed on top with the active material-coated side facing down. One drop of the electrolyte solution was deposited thereon, after which the coin cell case and gasket were placed on top and sealing was carried out with a coin cell crimper. The cell was then left at rest for 24 hours, thereby obtaining a secondary battery for testing.

Example 3-2

Electrode C2 was produced in the same way as in Example 3-1, except that Composite P2, produced in Example 2-2, was used instead of Active Material Composite P1, produced in Example 2-1 above.

A secondary battery for testing was produced using the obtained Electrode C2 in the same way as in Example 3-1.

Comparative Example 3-1

Electrode C3 was produced in the same way as in Example 3-1, except that Composite P3, produced in Comparative Example 2-1, was used instead of Active Material Composite P1, produced in Example 2-1 above.

A secondary battery for testing was produced using the obtained Electrode C3 in the same way as in Example 3-1.

Comparative Example 3-2

Electrode C4 was produced in the same way as in Example 3-1, except that Composite P4, produced in Comparative Example 2-2, was used instead of Active Material Composite P1, produced in Example 2-1 above.

A secondary battery for testing was produced using the obtained Electrode C4 in the same way as in Example 3-1.

Comparative Example 3-3

Electrode C5 was produced in the same way as in Example 3-1, except that a titanium dioxide powder in which no composite was formed was used as the active material instead of Active Material Composite P1, produced in Example 2-1 above.

A secondary battery for testing was produced using the obtained Electrode C5 in the same way as in Example 3-1.

For the lithium-ion secondary batteries produced in Examples 3-1 and 3-2 as well as Comparative Examples 3-1 to 3-3, the physical characteristics of the electrodes were evaluated under the following conditions using a charge/discharge measurement system. Table 1 shows the discharge capacity (rate characteristics) of each secondary battery for when discharged at a discharge rate of 0.1 C, 0.5 C, 1 C, 2 C, 3 C, or 5 C. Further, Table 2 shows the capacity retention rates (cycle characteristics) at different cycles for when discharged at a constant current of 0.5 C.

<Measurement Conditions>
—Rate Characteristics:
Current: charged at a constant current of 0.1 C; discharged at a constant current of 0.1 C, 0.5 C, 1 C, 2 C, 3 C or 5 C (the capacity of $TiO_2$ was considered to be 336 mAh/g, and the discharge rate was increased every three cycles, and finally, the discharge rate was set to 0.5 C)
—Cycle Characteristics:
Current: charged at a constant current of 0.1 C; discharged at a constant current of 0.5 C (the capacity of $TiO_2$ was considered to be 336 mAh/g)
—Cut-Off Voltage: 3.00 V to 1.00 V
—Temperature: Room Temperature

TABLE 1

| | Discharge capacity [mAh/g] | | | | | |
|---|---|---|---|---|---|---|
| | 0.1 C | 0.5 C | 1 C | 2 C | 3 C | 5 C |
| Example 3-1 | 201 | 181 | 158 | 126 | 100 | 62 |
| Example 3-2 | 182 | 156 | 137 | 101 | 67 | 34 |
| Comparative Example 3-1 | 195 | 165 | 129 | 85 | 55 | 28 |
| Comparative Example 3-2 | 182 | 110 | 61 | 34 | 25 | 18 |
| Comparative Example 3-3 | 203 | 173 | 101 | 48 | 38 | 31 |

TABLE 2

| | Initial capacity [mAh/g] | Capacity retention rate at 10 cycles [%] | Capacity retention rate at 20 cycles [%] |
|---|---|---|---|
| Example 3-1 | 181 | 78 | 58 |
| Example 3-2 | 180 | 76 | 58 |
| Comparative Example 3-1 | 165 | 62 | 42 |
| Comparative Example 3-2 | 172 | 42 | 24 |
| Comparative Example 3-3 | 173 | 70 | 28 |

The results in Table 1 above confirm that the secondary batteries of Examples 3-1 and 3-2, in which the active material composite of Examples 2-1 or 2-2 is used as the anode active material, have superior discharge capacity at high rates compared to the secondary batteries of Comparative Examples 3-1 to 3-3, in which the anode active material of Comparative Examples 2-1 to 2-2 or commercially available particles are used.

It has been confirmed, therefore, that the use of active material composites, in which the surface of the active material particles has a coating layer comprising a conductive material and a dispersant consisting of a vinyl polymer comprising a pendant oxazoline group as the anode active material improves electrical conductivity compared to active material composites produced using a dispersant different from the dispersant specified in the present invention or anode active materials in which no composite was formed, thereby improving the rate characteristics and lifetime characteristics of secondary batteries.

[2] Production and Evaluation of Lithium-Ion Batteries—2
(1) Preparation of Conductive Material Dispersion Example 4-1 Preparation of Carbon Nanotube Dispersion A6

1.0 g of PTPA-PBA, shown in the formula below, synthesized by the method described in WO 2014/042080, serving as a dispersant, was mixed with 48.0 g of cyclohexanone, to which 1.0 g of MWCNTs (TC-2010, manufactured by Toda Kogyo Corp.) was further added as a conductive material. The resulting mixture was subjected to ultrasonic treatment at room temperature for 30 minutes using a probe-type ultrasonicator to obtain Conductive Material Dispersion A6, a black, uniform dispersion of MWCNTs with no precipitates.

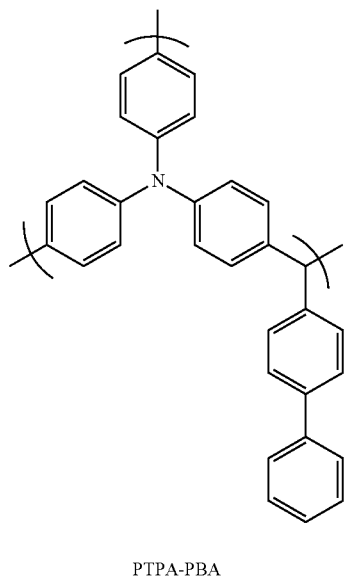

PTPA-PBA (2) Production of Active Material Composite

Example 5-1 Production of Active Material Composite P5

7.92 g of the ternary cathode active material $Li(Ni_{0.5}Co_{0.2}Mn_{0.3})O_2$ (NCM523-5Y, manufactured by Beijing Easping Material Technology) was mixed with 10 g of cyclohexanone. To the resulting mixture, 2.0 g of Conductive Material Dispersion A6, produced in Example 4-1, was mixed. The resulting mixture was dried using a rotary evaporator to obtain Active Material Composite P5.

(3) Production of Electrodes and Lithium-Ion Batteries

Example 6-1

3.02 g of Active Material Composite P5, produced in Example 5-1 above, 0.060 g of acetylene black (AB, manufactured by Denki Kagaku Kogyo K.K.) as a conductive aid, and 0.105 g of PTFE (F-104, manufactured by Daikin Industries, Ltd.) as a binder were mixed and kneaded in a mortar and then spread thinly on a glass plate with a glass rod to produce an electrode sheet (film thickness: 80 μm).

The electrode sheet was die cut into a disk having a diameter of 10 mm to produce Electrode C6. After Electrode C6 was measured for mass, it was vacuum dried at 120° C. for 12 hours, and transferred into a glove box filled with argon.

A stack of six pieces of lithium foil (manufactured by Honjo Chemical Corporation; thickness: 0.17 mm) that had been die-cut to a diameter of 14 mm was set on a 2032 coin cell (manufactured by Hohsen Corporation) cap to which a washer and a spacer had been welded, and one piece of separator (2400, from Celgard KK) die-cut to a diameter of 16 mm that had been impregnated for at least 24 hours with an electrolyte solution (manufactured by Kishida Chemical Co., Ltd.; an ethylene carbonate:diethyl carbonate=1:1 (volume ratio) solution containing 1 mol/L of lithium hexafluorophosphate as the electrolyte) was laid on the foil. Electrode C6 was then placed on top. One drop of the electrolyte solution was deposited thereon, after which the coin cell case and gasket were placed on top and sealing was carried out with a coin cell crimper. The cell was then left at rest for 24 hours, thereby obtaining a secondary battery for testing.

Comparative Example 6-1

Electrode C7 was produced in the same way as in Example 6-1, except that the raw material, which was the ternary cathode active material $Li(Ni_{0.5}Co_{0.2}Mn_{0.3})O_2$, was used instead of the Active Material Composite P5, produced in Example 5-1 above.

A secondary battery for testing was produced using the obtained Electrode C7 in the same way as in Example 6-1.

For the lithium-ion secondary batteries produced in Example 6-1 and Comparative Example 6-1, the physical characteristics of the electrodes were evaluated under the following conditions using a charge/discharge measurement system. Table 3 shows the charging capacity (rate characteristics) of each secondary battery for when charged at a charging rate of 0.1 C, 0.333 C, 0.5 C, or 1 C.

<Activation Conditions>

Current: charged and discharged at a constant current of 0.1 C; cutoff voltage was set at 3.0 to 4.2 V. The current values were set based on the capacity of the active material of 139 mAh/g.

<Measurement Conditions>

Current: charged at a constant current of 0.1 C, 0.333 C, 0.5 C, or 1 C; discharged at a constant current of 0.1 C (the charging rate was increased every one cycle, and finally, the charging rate was set to 0.1 C)

—Cut-Off Voltage: 3.00 V to 1.00 V
—Temperature: Room Temperature

TABLE 3

| | Charging capacity [mAh/g] | | | |
|---|---|---|---|---|
| | 0.1 C | 0.333 C | 0.5 C | 1 C |
| Example 6-1 | 156 | 153 | 150 | 139 |
| Comparative Example 6-1 | 155 | 141 | 131 | 0 |

The results in Table 3 above confirm that the secondary battery of Example 6-1, in which the active material composite of Example 5-1 is used as the cathode active material, has superior charging capacity at high rates compared to the secondary battery of Comparative Example 6-1, in which commercially available particles are used.

It has been confirmed, therefore, that the use of active material composites, in which the surface of the active material particles has a coating layer comprising a conductive material and a dispersant consisting of a triarylamine-based hyperbranched polymer as the cathode active material improves electrical conductivity, thereby improving the rate characteristics of secondary batteries.

What is claimed is:

1. A composition for forming an active material composite comprising at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer, wherein amount of oxazoline monomer in monomer ingredients used to prepare the vinyl polymer comprising a pendant oxazoline group is at least 10% by mass.

2. The composition for forming an active material composite according to claim 1, wherein the active material is at least one selected from $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x \leq 2$).

3. The composition for forming an active material composite according to claim 1, wherein the conductive material is conductive carbon.

4. The composition for forming an active material composite according to claim 3, wherein the conductive carbon is a carbon nanotube.

5. An active material composite obtained by drying the composition for forming an active material composite according to claim 1.

6. The active material composite according to claim 5, wherein a coating layer comprising a conductive material and a dispersant is formed on a surface of a particle of at least one active material selected from a metal, a metalloid, a metal alloy, a metal oxide, a metalloid oxide, a metal phosphate, a metal sulfide, and a metal nitride.

7. A composition for forming an electrode, comprising the active material composite according to claim 5, a conductive aid, and a binder.

8. An electrode having an active material layer consisting of the composition for forming an electrode according to claim 7.

9. A secondary battery comprising the electrode according to claim 8.

10. A method for producing the composition for forming an active material composite according to claim 1, comprising: preparing an active material dispersion comprising the active material and the solvent, and a conductive material dispersion comprising the conductive material, the dispersant, and the solvent separately, and then mixing the active material dispersion and the conductive material dispersion.

11. An active material composite comprising at least one active material selected from a metal, a metalloid, a metal alloy, a metal oxide, a metalloid oxide, a metal phosphate, a metal sulfide, and a metal nitride, a conductive material, and at least one dispersant selected from a vinyl polymer comprising a pendant oxazoline group and a triarylamine-based hyperbranched polymer, wherein amount of oxazoline monomer in monomer ingredients used to prepare the vinyl polymer comprising a pendant oxazoline group is at least 10% by mass.

12. The active material composite according to claim 11, wherein the active material is at least one selected from $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x \leq 2$).

13. The active material composite according to claim 11, wherein the conductive material is conductive carbon.

14. The active material composite according to claim 13, wherein the conductive carbon is a carbon nanotube.

15. A method for producing an active material composite comprising: mixing at least one active material selected from a metal, a metalloid, a metal alloy, a metal oxide, a metalloid oxide, a metal phosphate, a metal sulfide, and a metal nitride, a conductive material, a solvent, and at least one dispersant selected from a vinyl polymer comprising a pendant oxazoline group and a triarylamine-based hyperbranched polymer to prepare a composition for forming an active material composite, and drying the composition, wherein amount of oxazoline monomer in monomer ingredients used to prepare the vinyl polymer comprising a pendant oxazoline group is at least 10% by mass.

16. The method for producing an active material composite according to claim 15, wherein the drying is performed by spray drying.

17. The method for producing an active material composite according to claim 15, wherein the active material is at least one selected from the group consisting of $FeS_2$, $TiS_2$, $MoS_2$, $LiFePO_4$, $V_2O_6$, $V_6O_{13}$, $MnO_2$, $LiCoO_2$, $LiMnO_2$, $LiMn_2O_4$, $LiMo_2O_4$, $LiV_3O_8$, $LiNiO_2$, $Li_zNi_yM_{1-y}O_2$ (wherein M represents at least one metallic element selected from Co, Mn, Ti, Cr, V, Al, Sn, Pb, and Zn, $0.05 \leq z \leq 1.10$, and $0.5 \leq y \leq 1.0$), $Li(Ni_aCo_bMn_c)O_2$ (wherein $0<a<1$, $0<b<1$, $0<c<1$, $a+b+c=1$), $Li_4Ti_5O_{12}$, Si, $SiO_x$, $AlO_x$, $SnO_x$, $SbO_x$, $BiO_x$, $GeO_x$, $AsO_x$, $PbO_x$, $ZnO_x$, $CdO_x$, $InO_x$, $TiO_x$ and $GaO_x$ (wherein $0<x \leq 2$).

18. The method for producing an active material composite according to claim 15, wherein the conductive material is conductive carbon.

19. The method for producing an active material composite according to claim 18, wherein the conductive carbon is a carbon nanotube.

20. The method for producing an active material composite according to claim 15, wherein the composition for forming an active material composite is prepared by preparing an active material dispersion comprising the active material and a conductive material dispersion comprising the conductive material and the dispersant separately, and then mixing the active material dispersion and the conductive material dispersion.

* * * * *